US008207742B2

(12) United States Patent
Sawhney et al.

(10) Patent No.: US 8,207,742 B2
(45) Date of Patent: Jun. 26, 2012

(54) DIRECTIONAL ZONE SELECT INTERLOCK METHOD

(75) Inventors: Anupam Vinodkumar Sawhney, Gujarat (IN); Sriram Changali, Kerala (IN); Radoslaw Narel, Kensington, CT (US); Marcelo Esteban Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 662 days.

(21) Appl. No.: 12/347,570

(22) Filed: Dec. 31, 2008

(65) Prior Publication Data

US 2010/0164503 A1 Jul. 1, 2010

(51) Int. Cl.
G01R 31/08 (2006.01)
H02H 3/00 (2006.01)
(52) U.S. Cl. .......................................... 324/512; 361/62
(58) Field of Classification Search .................. 324/424, 324/512, 522, 524; 361/62–70, 79–84, 94; 340/664
See application file for complete search history.

(56) References Cited

U.S. PATENT DOCUMENTS

| | | | |
|---|---|---|---|
| 6,297,939 B1 | 10/2001 | Bilac et al. | |
| 6,985,784 B2 | 1/2006 | Vandevanter et al. | |
| 7,012,421 B2 | 3/2006 | Lavoie et al. | |
| 7,151,329 B2 | 12/2006 | Andarawis et al. | |
| 2004/0133370 A1 | 7/2004 | Lavoie et al. | |
| 2008/0158750 A1* | 7/2008 | Premerlani et al. | 361/63 |
| 2008/0158753 A1 | 7/2008 | Premerlani et al. | |
| 2008/0161979 A1 | 7/2008 | Papallo et al. | |

OTHER PUBLICATIONS

"The Single-Processor Concept for Protection and Control of Circuit Breakers in Low-Voltage Switchgear," M Valdes, T Papallo & I. Purkayastha, IEEE Transactions Jul./Aug. 2004.
"IEEE Guide for Performing Arc-Flash Hazard Calculations," IEEE Standard 1584-2002, Published by The Institute of Electrical and Electronic Engineers, Inc. NY, NY, Year: 2002.
"IEEE Guide for Performing Arc-Flash Hazard Calculations-Amendment 1" IEEE Standard 1584a-2204, Published by the Institute of Electrical and Electronic Engineers, Inc. NY, NY, Year: 2004.
"Zone Based Protection for Low Voltage Systems; Zone Selective Interlocking, Bus Differential and the Single Processor Concept." Valdes, M., Hamer, P. Paplla, T., Narel, R., Premerlani, B., Petroleum and Chemical Industry Technical Conference. 2007. PCIC '07. IEEE Published Sep. 17-19, 2007, pp. 1-10.

(Continued)

*Primary Examiner* — Timothy J Dole
*Assistant Examiner* — Daniel Miller
(74) *Attorney, Agent, or Firm* — Global Patent Operation; Stephen G. Midgley

(57) ABSTRACT

An improved method to detect and locate electrical faults is provided. A method of operating a circuit breaker in an electrical circuit configured with at least one of a first main circuit breaker at a first layer of circuit protection having a first direction of current flow, and at least one second circuit breaker downstream of said at least one first main circuit breaker having a second direction of current flow, and at least one third circuit breaker downstream of said at least one second circuit breaker having a third direction of current flow, wherein one of said at least one first, second, or third circuit breakers is in short time pick-up, is provided, and comprises steps to determine the location of the fault and adjust the trip time delay of the circuit breakers according to predetermined criteria.

14 Claims, 4 Drawing Sheets

OTHER PUBLICATIONS

"Optimizing System Coordination and Overcurrent Protection with Zoneselective Interlocking." Yong, S., Michalak, T. Textile, Fiber, and Film Industry Technical Conference 1990, Published May 2-3, 1990, pp. 9/1-9/6.

* cited by examiner

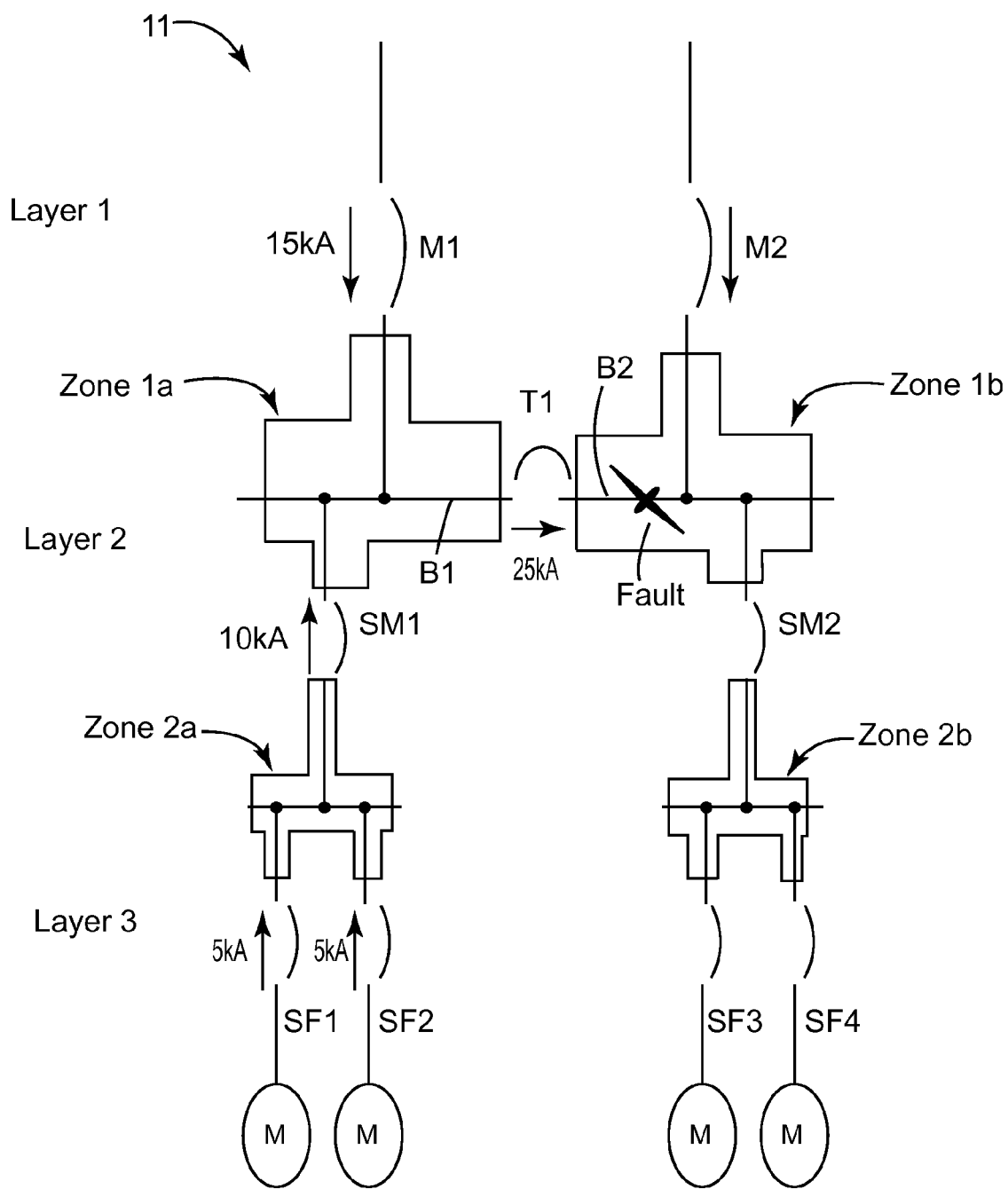

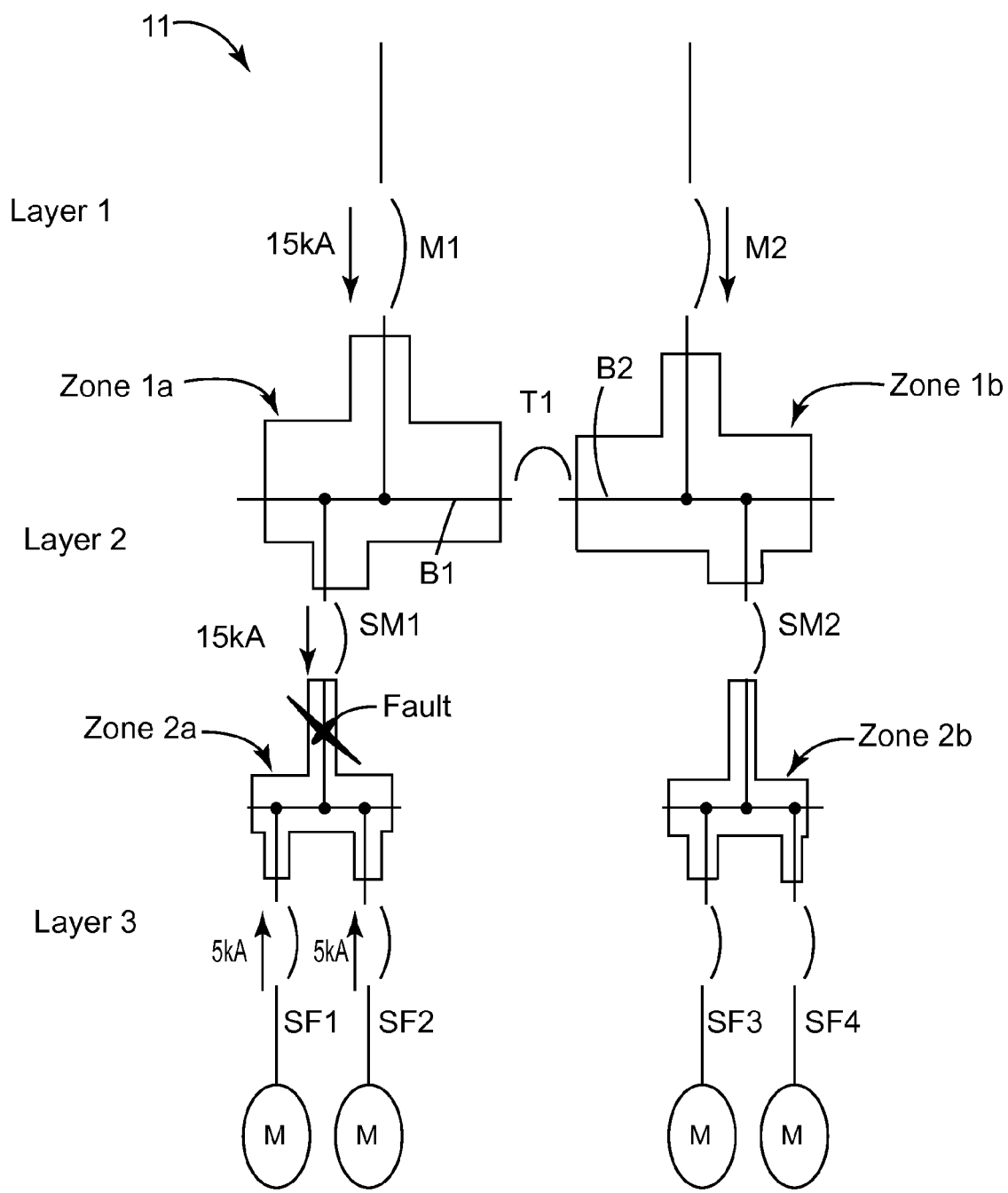

DIRECTIONAL ZONE SELECT INTERLOCK METHOD

BACKGROUND

1. Field of the Invention

The field of the invention relates to relays and circuit breakers generally, and more particularly to certain new and useful advances in power system protective relays and circuit breakers of which the following is a specification, reference being had to the drawings accompanying and forming a part of the same.

2. Discussion of Related Art

Low-voltage power distribution systems are expected to deliver reliable power within constraints including, but not limited to, cost and size using available technology. Protective devices are chosen, installed, and adjusted to quickly operate, and selectively and reliably protect the low-voltage power distribution system. Time-based coordination and protection is the conventional basis for coordinating low-voltage power distribution systems.

It will be understood that commonly used terms such as sub-main, feeder, sub-feeder, and branch are used to refer to circuit lines and their respective protective devices. These terms are sometimes used somewhat interchangeably depending upon, for example, the number of circuit protection hierarchy layers or other factors. For example, for a simple electrical distribution system with 3 hierarchy layers of circuit protection, the circuit breakers providing protection may be referred to, from upstream to downstream, as main, feeder, and sub-feeder circuit breakers. Alternatively, the same devices may also be referred to as main, sub-main, and feeder circuit breakers, or optionally, main, feeder, and branch circuit breakers. For purposes of clarity, a protective device hierarchy designation, from upstream to downstream, of main, sub-main, and feeder circuit breakers shall be used herein to refer to the devices in a 3 layer protective system. In general, the term feeder circuit breaker shall refer herein to the lowest downstream circuit breaker in a system branch. Additionally, the term "tie" circuit breaker generally refers herein to a protective device on a line of a circuit that links two circuit branches or buses.

Conventional electrical distribution systems may have one or more layers of protective devices, each protective device defining a zone of protection. The zone of protection for each protective device extends downstream on one or more buses, to the next layer downstream protective device. Additionally, a tie circuit breaker may optionally be located on any line connecting two buses within a given zone of protection.

Circuit breakers providing the first layer of protection in an electrical system are generally referred to as "main" circuit breakers and define a first zone of protection extending from the main circuit breaker to the next one or more subsequent downstream circuit breaker providing a $2^{nd}$ layer of protection. A circuit breaker providing the $2^{nd}$ layer of protection (excluding a tie circuit breaker), is generally referred to herein as a "sub-main" circuit breaker, and defines a second zone of protection extending from the sub-main circuit breaker to the next one or more subsequent downstream circuit breaker providing a $3^{rd}$ layer of protection, generally referred to herein as a "feeder" circuit breaker.

In the event of a fault (such as, but not limited to a short circuit, ground fault or an overload) the conventional protection system selectively coordinates the upstream and downstream breakers so that the nearest downstream breaker will clear the fault before the upstream breaker opens such that a minimal number of lines or feeders are de-energized.

Such time-based coordination can achieve good system selectivity; however, this system selectivity is achieved at the cost of speed for some of the coordinated relays. In a large power system, important main devices (i.e. upstream, source side protective devices such as main circuit breakers) may be significantly delayed to allow time for downstream layers of load side devices to clear selectively. To improve upon time-based coordination methods, zone-selective-interlocking (ZSI) techniques are often used.

A conventional zone selective interlock (ZSI) system improves the selective coordinated system by allowing the upstream breaker to identify a fault within its zone (i.e., ahead of the next layer of downstream circuit breakers or outlets) and clear this fault without adding the time delay required by selective-protection coordination.

More specifically, in a selectively coordinated protective system with conventional ZSI, when a downstream breaker detects a current greater than its ground fault (GF) pick-up, short time (ST) pick-up or its instantaneous (I) pick-up, it will send a restraint signal back to the upstream breaker. The upstream breaker, upon seeing the restraint signal, will begin to time out based on its conventional selective-coordination GF or ST time-delay-trip setting. In a first scenario, if the downstream breaker operates properly it will trip, thereby clearing the fault. Further, the upstream breaker will stop timing its GF or ST time-delay-trip setting and, thus, will not trip. In this first scenario, the downstream breaker cleared the fault and a minimal number of feeders were affected.

In a second scenario, if the downstream breaker detects the fault and sends a restraint signal to the upstream breaker but the downstream breaker does not operate properly to clear the fault the GF or ST time-delay-trip setting on the upstream breaker will time out and the upstream breaker will trip thereby clearing the fault. Thus, the upstream breaker acts as a back up breaker to the downstream breaker in the event that the downstream breaker does not operate properly. In this second scenario, however, all feeders downstream from the tripped upstream breaker are de-energized. In a third scenario, if the upstream breaker with conventional ZSI detects a GF or ST fault and does not receive a ZSI restraint signal from a downstream breaker, the upstream breaker will assume that the fault is in its protection zone (ahead of the next layer of downstream circuit breakers or outlets) and will trip with minimal time delay thereby quickly clearing the fault.

Patented disclosures of zone-selective interlock techniques may be found, for example, in U.S. Pat. Nos. 4,468,714; 5,151,842; 6,297,939 and US patent Publication 2008/0198521A1.

In certain cases, the conventional ZSI technique unnecessarily delays the tripping delay of a main circuit breaker. For example, a fault detection and isolation difficulty arises in the case of an electrical system fed by a first and a second separate power sources in parallel, and protected by a first and a second main circuit breakers connected in parallel, wherein a fault occurs between the first power source and its respective downstream main circuit breaker. If a tie circuit breaker is connected downstream and between the two main circuit breakers, and is CLOSED or conducting, the fault will be fed from both main circuit breakers. Additionally, if feeder circuit breakers downstream of the main circuit breakers are protecting motors, for example, the fault may also be fed from the motor loads. In such a case, mere knowledge of the fault current magnitude is not sufficient to identify the fault location, even when a conventional ZSI technique is used. In this case, the conventional ZSI operation would trip the feeder breakers and delay tripping of the main circuit breakers. Consequently, the clearing time for the fault increases, and in some cases results in nuisance tripping of circuit breaker in a non-faulted part of the system. Ideally, in this case, the main circuit breaker closest to the fault should trip to isolate the fault from the second power source without intentional delay. The tie circuit breaker as well as the second main circuit breaker should preferably remain closed. To accomplish this, the location of the fault must be known.

To overcome the above shortcomings of conventional ZSI, a Directional Zone Select Interlock (DZSI) technique was developed. For example, U.S. patent application Ser. No. 11/618,175 describes a DZSI technique and is assigned to the assignee of the present application and incorporated by reference herein.

However, in some scenarios, the DZSI algorithm may also fail to correctly identify the location of fault. Two such cases are discussed below. In each case the current is above ST pickup levels of at least one of the circuit breakers in the system.

DZSI and Motor Contribution:

FIG. 1 depicts a line diagram of a Directional Zone-Selective Interlocking system electrical power distribution system 11 having four ZSI zones, designated as protective Zone 1a, Zone 1b, Zone 2a, and Zone 2b. As shown, a first main circuit breaker M1 serves as an upstream breaker to downstream breakers in both Zone 1a and Zone 2a, which include a first sub-main circuit breaker SM1 and a tie circuit breaker T1 in Zone 1a, and feeder breakers SF1 and SF2 in Zone 2a. Similarly, a second main circuit breaker M2 serves as an upstream breaker to downstream breakers in both Zone 1b and Zone 2b, which include a second sub-main circuit breaker SM2 and the tie circuit breaker T1 in Zone 1b, and feeder breakers SF3 and SF4 in zone 2b. The tie circuit breaker T1 selectively connects a first bus B1 and a second bus B2. As shown, the electrical load downstream of the sub-feeder circuit breakers SF1 and SF2 are motor type loads.

FIG. 1 also depicts a bus fault at Zone 1b. Tie circuit breaker T1 between first bus B1 and second bus B2 is CLOSED (conducting), and second main circuit breaker M2 is OPEN (not conducting). Thus, the first main circuit breaker M1 will feed, or conduct, fault current into the second bus B2 through the tie circuit breaker T1. Additionally, if feeder circuit breaker SF1 and SF2 are connected to motor loads, they also will contribute to the fault current through the tie circuit breaker T1. For, example, if the first main circuit breaker M1 contributes 15 kA, and the feeder circuit breakers SF1 and SF2 each contribute 5 kA to the fault current, then the tie circuit breaker T1 will conduct a total fault current of 25 kA (i.e., 15 kA+5 kA+5 kA).

For the scenario illustrated in FIG. 1, the prior art Directional Zone Selective Interlock (DZSI) technique as described in U.S. patent application Ser. No. 11/618,175, titled Relay Device and Corresponding Method, calculates a Residual current ($I_R$) for Zone 1a as a reference for determining the direction of currents carried by the feeder circuit breakers, where:

$$I_R = I_{M1} * D_{M1} + I_{T1} * D_{T1}$$

Where $I_{M1}$ & $I_{T1}$ are currents in the first main circuit breaker M1 and the tie breaker T1 respectively, and $D_{M1}$ & $D_{T1}$ are relative current directions; and current into the zone is considered as positive while current out of the zone is considered as negative for calculation of current direction; giving $$I_R = 10 \text{ kA}*(+1) + 25 \text{ kA}*(-1)$$

$$I_R = -15 \text{ kA}$$

In the scenario of FIG. 1, the current carried by the first sub-main breaker SM1 is about −10 kA. Because the feeder circuit breakers SF1, SF2 are in ST pickup, and the residual current for Zone 1a is negative, $I_R = -15$ kA, (i.e., out of Zone 1), the prior art DZSI technique considers this fault as a forward fault below Zone 2a and declares a feeder fault below Zone 2a. Actually, the fault is only present in Zone 1b and not in Zone 2a. Subsequently, the delay of the first main circuit breaker M1 and the tie circuit breaker T1 is incremented by about 200 milliseconds due to the DZSI operation. Although the prior art method correctly identifies a bus fault in Zone 1b, the tripping of the tie circuit breaker T1 is delayed because of the detection of sub-main fault in Zone 2a, resulting in increased fault clearing time.

Delayed Tripping of Sub-Main With DZSI:

Referring now to FIG. 2, the electrical distribution system of FIG. 1 is depicted, except, instead of a bus fault at Zone 1b, a fault is depicted downstream of the sub-main breaker SM1 in Zone 2a. The fault is fed current by the first main circuit breaker M1 as well as by feeder circuit breakers SF1, SF2. The first main circuit breaker M1 and first sub-main circuit breaker SM1 conduct currents in forward direction while both the feeder circuit breakers SF1 and SF2, being upstream of inductive motor loads, carry currents in the reverse direction. Since the conventional DZSI method algorithm does not consider the direction of currents in feeder breakers, the conventional DZSI method declares a feeder fault instead of sub-main fault. Consequently, the fault clearing time of first sub-main circuit breaker SM1 is delayed by about 100 milliseconds (ms).

A need exists for an improved system and method to implement directional zone-based protection to achieve fast fault protection while maintaining selectivity for a broad range of fault magnitudes, system configurations and load types. The present invention provides an improved method to overcome the deficiencies of the prior art.

BRIEF SUMMARY OF THE INVENTION

An improved method to detect and locate electrical faults is provided. A method of operating a circuit breaker in an electrical circuit configured with at least one of a first main circuit breaker at a first layer of circuit protection having a first direction of current flow, and at least one second circuit breaker downstream of said at least one first main circuit breaker having a second direction of current flow, and at least one third circuit breaker downstream of said at least one second circuit breaker having a third direction of current flow, wherein one of said at least one first, second, or third circuit breakers is in Short Time pick-up, is provided, and comprises steps to determine the location of the fault and adjust the trip time delay of the circuit breakers according to predetermined criteria.

Other features and advantages of the disclosure will become apparent by reference to the following description taken in connection with the accompanying drawings.

BRIEF DESCRIPTION OF THE DRAWINGS

Reference is now made briefly to the accompanying drawings, in which:

FIG. 1 is a line diagram of an electrical power distribution system with a fault depicted therein;

FIG. 2 is the line diagram of the electrical power distribution system of FIG. 1, with a fault depicted at another location therein;

FIG. 3b is a flow diagram continuing the method of FIG. 3a

Like reference characters designate identical or corresponding components and units throughout the several views, which are not to scale unless otherwise indicated.

DETAILED DESCRIPTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Figure 3A:
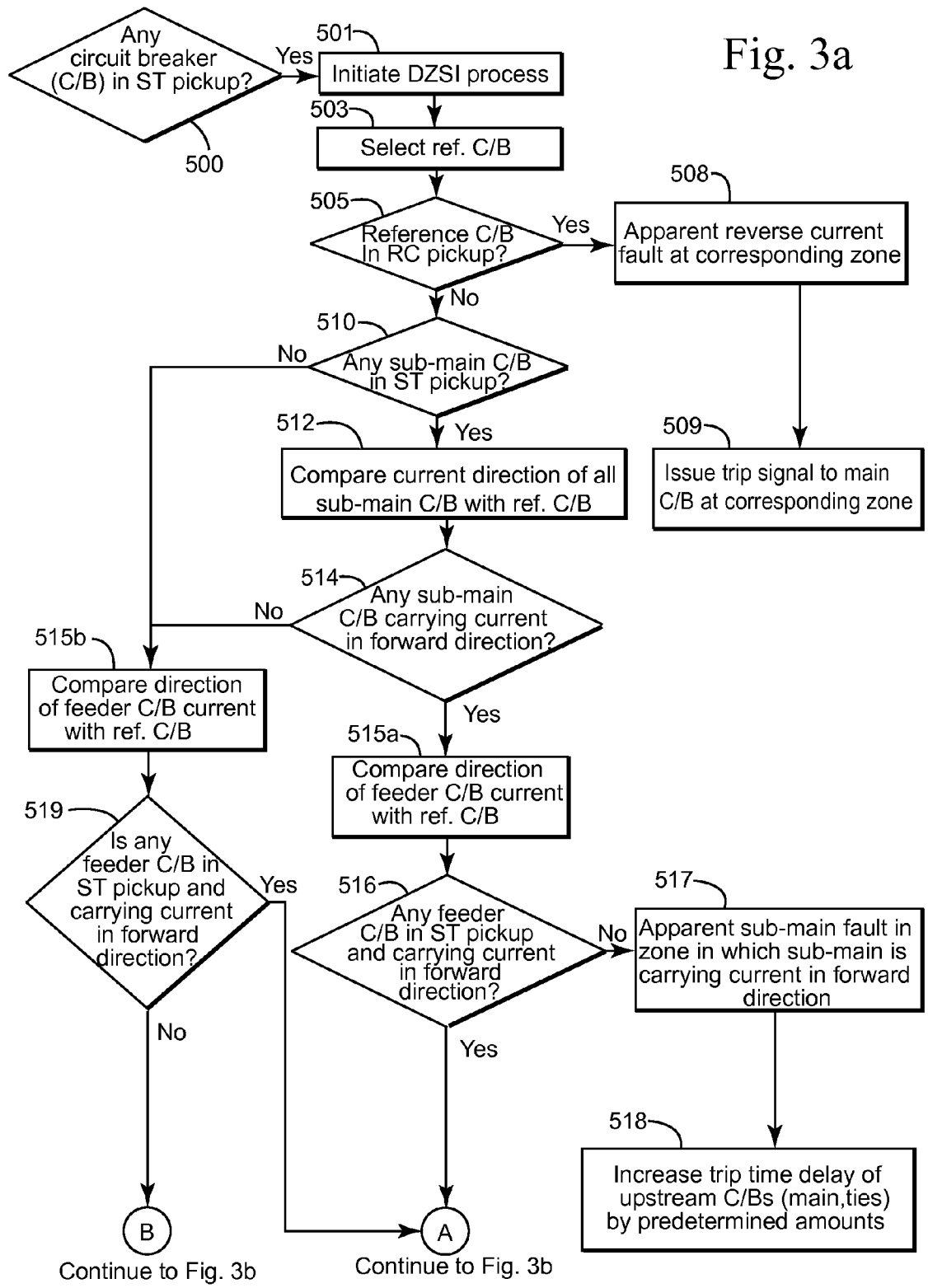
FIG. 3a is a flow diagram of a computer-implemented Directional Zone Select Interlock method according to an embodiment of the invention.
Figure 3B:
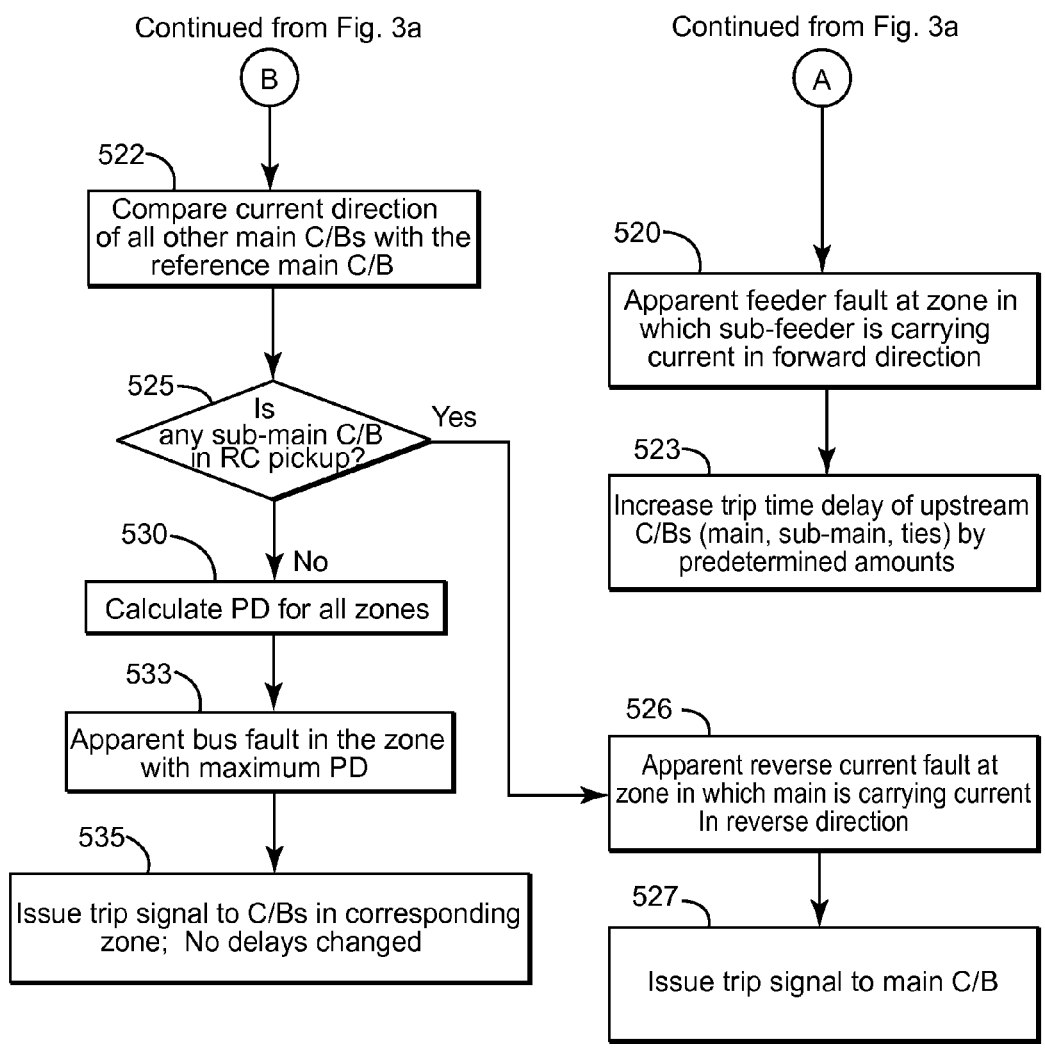

FIG. 3a and FIG. 3b are flow diagrams of a computer-implemented Directional Zone Select Interlock method according to an embodiment of the invention. Each block, or combination of blocks, depicted in the block diagram can be implemented by computer program instructions. These computer program instructions may be loaded onto, or otherwise executable by, a computer or other programmable apparatus to produce a machine, such that the instructions, which execute on the computer or other programmable apparatus create means or devices for implementing the functions specified in the block diagram. These computer program instructions may also be stored in a computer-readable memory that can direct a computer or other programmable apparatus to function in a particular manner, such that the instructions stored in the computer-readable memory produce an article of manufacture, including instruction means or devices which implement the functions specified in the block diagrams, flowcharts or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams, flowcharts or control flow block(s) or step(s).

Accordingly, blocks or steps of the flowchart illustration supports combinations of means or devices for performing the specified functions, combinations of steps for performing the specified functions and program instruction means or devices for performing the specified functions. It will also be understood that each block or step of the flowchart, and combinations of blocks or actions depicted in the flowchart, can be implemented by a special or general-purpose hardware-based computer system that is configured to perform the specified functions or steps, or combinations of special purpose hardware and computer instructions.

Improved DZSI Algorithm—Referring now to FIG. 3a and FIG. 3b, the flow charts illustrate an embodiment of the present invention for determining fault location within an electrical distribution system having one or more layers of protective devices, each protective device defining a zone of protection. The zone of protection for each protective device extends downstream on one or more buses, to the next subsequent downstream protective device or devices. Optionally, a tie circuit breaker may be located on any line that connects two buses within a given zone of protection.

At step 501 the method begins when any circuit breaker in the electrical distribution system has entered ST (Short Time) pickup, (i.e., timing out based on its conventional selective coordination ST time-delay trip setting).

Next, at step 503, a reference main circuit breaker is selected and the direction of the current through the reference main circuit breaker will be referenced for current direction comparison. Preferably, if there is more than one main circuit breaker, then the main circuit breaker carrying the maximum current is selected.

At decision 505, the reference main circuit breaker is checked for a reverse current (RC) fault, preferably by determining if the reference circuit breaker is in RC pickup. If so, at step 508, a reverse current fault is determined and at step 509 a trip signal is issued to the main circuit breaker for the zone in which a fault was determined.

If the reference circuit breaker does not carry a reverse current fault, it remains as reference circuit breaker and at decision 510, it is determined whether a $2^{nd}$ layer or sub-main circuit breaker in the system has detected a fault condition, preferably by determining if any $2^{nd}$ layer or sub-main circuit breaker is in ST pickup. If so, at step 512, the current direction of each $2^{nd}$ layer or sub-main circuit breaker is determined and compared with the current direction of the reference circuit main circuit breaker selected in step 503.

Next, at decision 514, it is determined if any $2^{nd}$ layer or sub-main circuit breaker is carrying current in the forward direction. In one exemplary embodiment, if a $2^{nd}$ layer or sub-main circuit breaker is carrying more than 10-times rated current, it is considered to be carrying current in the forward direction.

If at decision 514, any $2^{nd}$ layer or sub-main circuit breaker is determined to be carrying current in the forward direction, then at step 515a the direction of current flow through the feeder breakers is compared with the direction of current through the reference main circuit breaker. Then, at decision 516 it is determined if any breaker downstream of the $2^{nd}$ layer or sub-main, (i.e., any feeder circuit breaker) is in ST pickup and carrying current in the forward direction.

If so, then at step 520, (FIG. 3b) a feeder fault condition is declared for any zone in which the feeder is carrying current in the forward direction and the trip time delay of the feeder breaker for that zone is preferably kept unchanged, and the delay of higher tiers breakers (such as sub-main, main, and tie circuit breakers) are adjusted according to a predetermined amount. In one embodiment, the trip time delays of upstream sub-main circuit breakers are increased by about 100 ms and upstream main and tie circuit breakers are each increased by about 200 ms.

If at decision 516 it is determined if any breaker downstream of the $2^{nd}$ layer or sub-main, (i.e., any feeder circuit breaker) is not in ST pickup and carrying current in the forward direction, then a sub-main fault condition is declared at step 517 for any zone in which the sub-main circuit breaker is carrying current in the forward direction. Thus, if no feeder circuit breaker is in ST pickup, or, no feeder circuit breaker in ST pickup is carrying current in the forward direction, then the sub-main fault condition is declared at step 517 and the trip time delay of the sub main circuit breaker is preferably not changed and the delay of the circuit breakers upstream of the sub-main circuit breaker are increased according to a predetermined amount. In one embodiment, when a sub-main fault is detected, the trip time delay of upstream main and tie circuit breakers is increased by about 100 ms.

If it is determined at step 510 that no sub-main circuit breaker is in ST pickup, or, if it determined at step 514 that no sub-main circuit breaker is carrying current in the forward direction, then at step 515b the direction of current flow through the feeder breakers is compared with the direction of current through the reference main circuit breaker. Then, at decision 519, it is determined if any feeder circuit breaker is in ST pickup and carrying current in the forward direction. If so, then at step 520, (FIG. 3b) a feeder fault condition is declared for any zone in which the feeder is carrying current in the forward direction, and the trip time delay of the feeder breaker for that zone is preferably kept unchanged, while the trip time delay of higher tiers breakers (such as sub-main, main, and tie circuit breakers) is adjusted according to a predetermined amount. In one embodiment, the trip time delay of upstream sub-main circuit breakers is increased by about 100 ms and upstream main and tie circuit breakers are increased by about 200 ms.

If, at decision 519, it is determined that no feeder circuit breaker in the system is in ST pickup and carrying current in the forward direction, that is, no sub-main or feeder fault is detected, then at step 522 (FIG. 3b) the current direction of all other main circuit breakers in the system is compared with the reference main circuit breaker.

Next, at decision 525, it is determined if any of the main breakers are carrying current in opposite direction to the reference circuit breaker and determining if any main circuit breaker is in RC pickup. If so, at step 526 a reverse current fault is declared in any zone in which the main circuit breaker is determined to be carrying current in reverse direction and the trip time delay of the main circuit breaker for the zone in which a fault was detected are adjusted according to a predetermined amount. In one embodiment, the delay is zero and the main circuit breaker is tripped immediately.

If not, then at step 530, a calculation of a partial differential zone current is computed for all zones in the system to determine the zone having the greatest partial differential current. Preferably, only main circuit breakers and tie circuit breakers constitute a partial differential (PD) zone. The partial differential zone current calculation does not include the current carried by sub-main breakers connected to the bus. At step 533, a bus fault is declared in the zone that is found to have maximum partial differential and the circuit breakers in the zone in which the bus fault occurred are tripped immediately and no delays are changed.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to determine the location of a fault in an electrical system and to adjust the trip time delays of circuit breakers in the electrical system according to predetermined amounts.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of operating a circuit breaker in an electric circuit, said method comprising:
    identifying a first circuit breaker as a reference circuit breaker;
    determining when said identified reference circuit breaker is in reverse current pick-up; and when not, determining when a second circuit breaker is in short-time pick-up, indicative of a fault on the electric circuit; and when not;
    comparing a third direction of current flow through a third circuit breaker with a first direction of current flow through said identified reference circuit breaker;
    determining if said third circuit breaker is carrying current in a forward direction with respect to said identified reference circuit breaker and when said third circuit breaker is not in short-time pick-up, executing the steps of:
        comparing a first direction of current flow through a first circuit breaker other than said identified reference circuit breaker with said first direction of current flow through said identified reference circuit breaker;
        determining when said first main circuit breaker other than said identified reference circuit breaker is in reverse current pick-up; and
        when said first main circuit breaker other than said identified reference circuit breaker is in reverse current pick-up,
        tripping said first main circuit breaker determined to be in reverse current pickup;
    when the first circuit breaker other than said identified reference circuit breaker is not in reverse current pick-up executing the steps of:
        calculating a partial differential current for each of a plurality of zones in said electrical system; and
        identifying one of said zones in said electrical system as carrying a maximum partial differential current; and
        tripping said circuit breaker in said identified one zone identified as carrying said maximum partial differential current; and
    increasing by a predetermined amount a trip time delay of said first and said second circuit breaker upstream of said third circuit breaker.

2. The method of claim 1 further comprising, when said second circuit breaker is determined to be in short-time pick-up, indicative of a fault on the circuit, the step of:

comparing a second direction of current flow through said second circuit breaker with said first direction of current flow through said identified reference circuit breaker;

identifying when said second circuit breaker is carrying current in a forward direction with respect to the identified reference circuit breaker; and if not, comparing said third direction of current flow through said third circuit breaker with said first direction of current flow through said identified reference circuit breaker;

determining when said third circuit breaker is carrying current in a forward direction with respect to the identified reference circuit breaker; and is in short-time pickup, and when so;

increasing by a predetermined amount the trip time delay of said first and said second circuit breaker upstream of said identified third circuit breaker.

3. The method of claim 2 further comprising, when said second circuit breaker is carrying current in a forward direction with respect to said identified reference circuit breaker, the steps of:

determining when said third circuit breaker is carrying current in a forward direction with respect to said identified reference circuit breaker; and is in short-time pickup, and when so;

increasing by a predetermined amount the trip time delay of said first and said second circuit breaker upstream of said identified third circuit breaker.

4. The method of claim 3 further comprising, when said third circuit breaker is not carrying current in a forward direction with respect to said identified reference circuit breaker, the step of:

increasing by a predetermined amount the trip time delay of said first circuit breaker upstream of said identified second circuit breaker.

5. The method of claim 1, wherein said first circuit breaker is a main circuit breaker.

6. The method of claim 5, wherein said second circuit breaker is a sub-main circuit breaker.

7. The method of claim 5 wherein said third circuit breaker is a feeder circuit breaker.

8. The method of claim 1 wherein said second or said third circuit breaker carrying more than 10-times its rated current is considered to be carrying current in the forward direction.

9. The method of claim 1 wherein said predetermined amount of trip time delay of said second circuit breaker upstream of said third circuit breaker is increased by about 100 ms, and said predetermined amount of trip time delay of said first circuit breaker upstream of said third circuit breaker is increased by about 200 ms.

10. The method of claim 2 wherein said predetermined amount of trip time delay of said second circuit breaker upstream of said third circuit breaker is increased by about 100 ms, and said predetermined amount of trip time delay of said first circuit breaker upstream of said at least one third circuit breaker is increased by about 200 ms.

11. The method of claim 3 wherein said predetermined amount of trip time delay of said second circuit breaker upstream of said third circuit breaker is increased by about 100 ms, and said predetermined amount of trip time delay of said first circuit breaker upstream of said third circuit breaker is increased by about 200 ms.

12. The method of claim 4 wherein said predetermined amount of trip time delay of said at least one first circuit breaker upstream of said identified second circuit breaker is increased by about 100 ms.

13. The method of claim 1 wherein said first circuit breaker is tripped without intentional delay.

14. The method of claim 1 wherein said circuit breakers in said identified one zone identified as carrying said maximum partial differential current is tripped without intentional delay.

* * * * *

UNITED STATES PATENT AND TRADEMARK OFFICE
CERTIFICATE OF CORRECTION

PATENT NO. : 8,207,742 B2
APPLICATION NO. : 12/347570
DATED : June 26, 2012
INVENTOR(S) : Sawhney et al.

Page 1 of 1

It is certified that error appears in the above-identified patent and that said Letters Patent is hereby corrected as shown below:

In Column 8, Line 67, in Claim 3, delete "step" and insert -- steps --, therefor.

In Column 10, Line 18, in Claim 10, delete "said at least one" and insert -- said --, therefor.

In Column 10, Line 27, in Claim 12, after said delete "at least one", therefor.

Signed and Sealed this
Twenty-seventh Day of November, 2012

David J. Kappos
*Director of the United States Patent and Trademark Office*